3,359,341
EXTRACTION OF HYDROCARBONS
Hans Berthold Wiener and William Featherstone, Norton-on-Tees, England, assignors to Imperial Chemical Industries Limited, London, England, a corporation of Great Britain
No Drawing. Filed Apr. 6, 1964, Ser. No. 357,819
Claims priority, application Great Britain, May 1, 1963, 17,221/63
16 Claims. (Cl. 260—674)

This invention relates to the extraction of hydrocarbons. Olefines may be separated from paraffins by extraction with an aqueous solution of a salt such as a fluoborate or fluosilicate of certain heavy metals, for example copper, mercury and in particular silver, which retains the olefine in the form of a complex in the aqueous solution while leaving the paraffin unaffected and readily separated therefrom. The olefine may then be recovered substantially free from the paraffins and the solution regenerated at the same time, by for example heating the aqueous solution or by contact with an immiscible organic solvent or by reduction in pressure. Aromatic hydrocarbons also form complexes with these metal salts, but usually to a more limited extent, so that their separation from paraffins by this method has not hitherto been completely successful.

We have now found however that the separation of aromatic hydrocarbons from paraffins by this method is considerably improved by the presence, during the extraction, of olefines which increase the solubility of the aromatic hydrocarbons. The olefine and aromatic hydrocarbon are both absorbed by the heavy metal salt solution, from which they may be recovered by the means described above. To facilitate the subsequent separation the olefine is selected to be readily separable from the aromatic hydrocarbon by simple means such as distillation.

Accordingly the present invention provides a process for the separation of aromatic hydrocarbons from paraffins which comprises contacting the mixture of liquid or gaseous hydrocarbons with an aqueous solution of salt of a heavy metal in the presence of an olefine in sufficient quantity to facilitate the absorption of the aromatic hydrocarbon by the heavy metal salt solution, to extract the aromatic hydrocarbon, separating the extract from the paraffin, recovering the aromatic hydrocarbon and olefine from the extract, thereby regenerating the aqueous solution.

The aromatic hydrocarbon and the olefine may be recovered together from the heavy metal salt solution and subsequently separated by means such as distillation, or their complexes with the heavy metal salt may be selectively decomposed so that each are recovered separately.

The quantity of olefine required depends on the quantity and nature of the aromatic hydrocarbon to be extracted and the nature of the olefine, and may be determined by simple experiment. The presence of the olefine may be provided for by a suitable choice of conditions in the production of the mixture of hydrocarbons used as feedstock for the process of the present invention. Alternatively if the concentration of a suitable olefine in the hydrocarbon mixture is too low a suitable olefine may be added either by admixing it with the other hydrocarbons, or with the aqueous solution, or it may be added at the same time as the extraction is carried out.

The amount of olefine present during the extraction should not be so much that the capacity of the aqueous solution to form hydrocarbon complexes is exhausted or substantially impaired. The solubility effect of the olefine depends upon such factors as the nature of the olefine, the amount present, the extraction temperature and the nature of the aromatic hydrocarbon affected. In general, increasing the carbon chain length of the olefine and decreasing the extraction temperature enhances the solubility effect upon a given aromatic hydrocarbon, and other factors being equal, the effect is usually more marked with increased alkylation of the aromatic hydrocarbon. However, the choice of olefine should be decided upon as a balance between ease of separation from the aromatics, and the magnitude of its solubility effect. Thus for separating benzene, octene-1 is preferred whereas for separating xylenes we prefer hexene-1. A generally convenient olefine to use, for example where mixtures of aromatic hydrocarbons are to be separated from paraffins is decene-1. In the course of the extraction part of the process according to the invention the olefine usually distributes itself between the aqueous and organic phases, with the result that only part of the olefine added initially is finally recovered with the aromatic hydrocarbons, the residue remaining with the unaffected hydrocarbons.

The increase in solubility of aromatics in solutions of heavy metals is demonstrated by the following experimental results. In each case an aqueous solution of silver fluoborate containing 840 grams of silver per litre was shaken with an equal volume of the aromatic hydrocarbon or the aromatic hydrocarbon and the olefine until equilibrium was reached. After settling, the unaffected hydrocarbons were removed by decantation. The extracted hydrocarbons were then recovered as a distillate from the aqueous extract by heating it. Finally the recovered hydrocarbons were separated by fractional distillation and measured.

| Temperature at which the extraction was carried out | Composition of the aqueous layer after extraction (percent w./w.) | | |
|---|---|---|---|
| | Silver fluoborate | Benzene | Pentene-1 |
| 20° C | 86.3 | 13.7 | |
| 20° C | 78.5 | 15.0 | 6.5 |
| 5° C | 84.5 | 15.5 | |
| 5° C | 72.5 | 19.7 | 7.8 |
| | Silver fluoborate | m-Xylene | Pentene-1 |
| 20° C | 99.5 | 0.5 | |
| 20° C | 85 | 7.5 | 7.5 |
| 0° C | 99.5 | 0.5 | |
| 0° C | 79.5 | 11.5 | 9 |
| | Silver fluoborate | m-Xylene | Octene-1 |
| 20° C | 99.5 | 0.5 | |
| 20° C | 60.5 | 24.6 | 14.9 |
| 0° C | 99.5 | 0.5 | |
| 0° C | 54 | 38 | 8 |
| | Silver fluoborate | Benzene | Octene-1 |
| 20° C | 86.3 | 13.7 | |
| 20° C | 58 | 27 | 15 |
| 5° C | 84.5 | 15.5 | |
| 5° C | 47 | 39 | 14 |

These figures illustrate the improved solubility of the aromatic hydrocarbon in the heavy metal salt solution in the presence of an olefine.

EXAMPLE

In this example each of a series of hydrocarbon mixtures consisting of predetermined amounts of heptane and benzene was extracted with aqueous solutions of silver fluoborate containing 840 grams of silver per litre and octene-1. Each extraction was carried out batchwise at 20° C. by shaking with an equal volume, corresponding to a stoichiometric excess of the aqueous solution with the hydrocarbon mixture until equilibrium was reached.

After settling, the unaffected hydrocarbons were removed by decantation. The extracted hydrocarbons were then recovered as a distillate from the aqueous extract by heating it, thereby regenerating the solution. Finally, the recovered hydrocarbons were separated by fractional distillation and measured. In the table the weight percent benzene content is given for each hydrocarbon mixture extracted and for aqueous extracts therefrom obtained by extraction with the silver extracting solutions initially containing (a) 15 weight percent and (b) 38 weight percent of octene-1. After the extractions these concentrations fell to about 5.7 weight percent and 15.2 weight percent in each case.

| Benzene Content, percent w./w. | | |
|---|---|---|
| Hydrocarbon mixture | Aqueous extract | |
| | (a) | (b) |
| 20 | 2.8 | 2.8 |
| 40 | .61 | 7.5 |
| 50 | 8.1 | 8.4 |
| 60 | 9.9 | 11.2 |
| 70 | 11.0 | 13.6 |
| 85 | 15.9 | 17.7 |

It will be observed from the table that substantially more benzene is extracted by increasing the amount of olefine present during the reaction.

In an experiment in which the aqueous extract contained no olefine but which was otherwise carried out in the same way as the above example, the hydrocarbon mixture contained 60% benzene by weight, but only 5.9 weight percent of benzene was extracted compared with the values of 9.9% and 11.2% in the above table.

What is claimed is:

1. In a process for the separation of aromatic hydrocarbon from a mixture comprising aromatic hydrocarbons, olefins, and paraffin wherein the mixture is contacted with an aqueous solution of a salt of a heavy metal whereby the aromatic hydrocarbon is absorbed by said solution to effect separation thereof from the paraffin, the improvement which comprises adding to said mixture, either prior to or during the absorption step, a predetermined amount of an olefine to increase the solubility of the said aromatic hydrocarbons in the said solution, whereby a greater amount of aromatic hydrocarbon may be separated from the paraffin.

2. A process according to claim 1 in which the aromatic hydrocarbon and the olefine are recovered together from the heavy metal salt solution and subsequently separated.

3. A process according to claim 1 in which the aromatic hydrocarbon and the olefine are recovered separately by selective decomposition of their complexes with the heavy metal salt solution.

4. A process according to claim 1 in which the olefine is added by admixture with the other hydrocarbons or with the aqueous solution.

5. A process according to claim 1 in which the olefine is added as a separate component to the mixture of hydrocarbons and heavy metal salt solution.

6. A process according to claim 1 in which the olefine is decene-1.

7. A process according to claim 1 in which the aromatic hydrocarbon is benzene and the olefine octene-1.

8. A process according to claim 1 in which the aromatic hydrocarbon is a xylene or mixture of xylenes and the olefine hexene-1.

9. A process according to claim 1 in which the amount of olefine present is less than that required to exhaust or substantially impair the capacity of the aqueous solution to form hydrocarbon complexes.

10. A process according to claim 1 in which the heavy metal is copper or mercury.

11. A process according to claim 1 in which the heavy metal salt is a fluoborate or fluosilicate.

12. A process according to claim 1 in which the heavy metal is silver.

13. A process according to claim 1 in which the heavy metal salt is silver fluoborate.

14. A process according to claim 1 in which the heavy metal salt is silver fluosilicate.

15. A process according to claim 1 in which the aromatic hydrocarbon and the olefine are recovered from the extract by heating.

16. A process according to claim 1 in which the aromatic hydrocarbon and the olefine are recovered from the extract by contact with an organic solvent immisicble with the said extract.

References Cited

UNITED STATES PATENTS 3,201,489  8/1965  Knaack _____ 260—674

FOREIGN PATENTS 987,065  3/1965  Great Britain.
1,293,986  4/1962  France.

DELBERT E. GANTZ, *Primary Examiner.*

PAUL M. COUGHLAN, JR., *Examiner.*

C. E. SPRESSER, *Assistant Examiner.*